(12) United States Patent
Pilawka et al.

(10) Patent No.: US 10,040,917 B2
(45) Date of Patent: Aug. 7, 2018

(54) 1C SYSTEM, PRODUCTS TO BE MANUFACTURED FROM THE SYSTEM, AND A METHOD FOR MANUFACTURING SEMIFINISHED, FIBER-REINFORCED PRODUCTS AND COMPONENTS WITH THE 1C SYSTEM

(71) Applicants: Leichtbau-Zentrum Sachsen GmbH, Dresden (DE); New Era Materials Sp. z o.o., Szczecin (PL)

(72) Inventors: Ryszard Pilawka, Szczecin (PL); Maciej Jarkowski, Bezrzecze (PL); Werner Hufenbach, Dresden (DE); Martin Lepper, Dresden (DE); Ole Renner, Dresden (DE); Andrzej Czulak, Zielonki (PL); Sirko Geller, Dresden (DE)

(73) Assignees: Leichtbau-Zentrum Sachsen GmbH, Dresden (DE); New Era Materials Sp. z o.o., Szczecin (PL)

( * ) Notice: Subject to any disclaimer, the term of this patent is extended or adjusted under 35 U.S.C. 154(b) by 310 days.

(21) Appl. No.: 14/941,547

(22) Filed: Nov. 14, 2015

(65) Prior Publication Data

US 2017/0137586 A1    May 18, 2017

(51) Int. Cl.
*C08G 65/04* (2006.01)
*C08J 5/24* (2006.01)
(Continued)

(52) U.S. Cl.
CPC ............. *C08J 5/24* (2013.01); *B29C 70/50* (2013.01); *B29C 70/506* (2013.01); *B29C 41/20* (2013.01);
(Continued)

(58) Field of Classification Search
CPC ......... C08J 5/24; C08J 2363/00; C08G 59/22; C08L 63/00; B29C 70/50; B29C 70/506; B29C 41/20; B29C 41/30; B29K 2105/0872; B29K 2105/251; B29K 2063/00; B29L 2007/008
See application file for complete search history.

(56) References Cited

U.S. PATENT DOCUMENTS 3,677,978 A    7/1972  Dowbenko et al.
4,312,974 A    1/1982  Chiao
(Continued)

FOREIGN PATENT DOCUMENTS

DE    19537449 A1    4/1997
EP    0397976 A2    11/1990
(Continued)

OTHER PUBLICATIONS

R. Pilawka, T. Spychaj, A. Leistner, Polimery 2008, 53 nr 7-8 str. 526-530, "Kompozycje epoksydowe sieciowane kompleksame imidazoli z kationem Cu(II)".
(Continued)

*Primary Examiner* — Shane Fang
(74) *Attorney, Agent, or Firm* — Michael Soderman

(57) ABSTRACT

The invention relates to a 1C system and a method for manufacturing semifinished products (prepregs) and components with the 1C system. The problem is solved by a 1C system comprised of an epoxy resin and a secondary amine; the secondary amine is imidazole, an imidazole derivative or a complex of the general formula $MeL_4X_2$, wherein Me is a bivalent metal cation selected from copper, cobalt, nickel and zinc, L is a ligand selected from imidazole and an imidazole derivative, and X is an anion selected from fluoride, chloride, bromide, iodide and nitrate. Furthermore, the invention includes a method for manufacturing impregnated semifinished products for the production of duroplastic fiber-reinforced components using a 1C system.

14 Claims, 1 Drawing Sheet

(51) Int. Cl.
  *B29C 70/50* (2006.01)
  *B29C 41/30* (2006.01)
  *B29K 63/00* (2006.01)
  *B29L 7/00* (2006.01)
  *B29C 41/20* (2006.01)
  *B29K 105/00* (2006.01)
  *B29K 105/08* (2006.01)

(52) U.S. Cl.
  CPC .......... *B29C 41/30* (2013.01); *B29K 2063/00* (2013.01); *B29K 2105/0872* (2013.01); *B29K 2105/251* (2013.01); *B29L 2007/008* (2013.01); *C08J 2363/00* (2013.01)

(56) References Cited

U.S. PATENT DOCUMENTS

| | | | |
|---|---|---|---|
| 4,459,398 | A | 7/1984 | Dearlove et al. |
| 6,124,023 | A | 9/2000 | Furuta et al. |
| 2002/0090754 | A1 | 7/2002 | Chan et al. |

FOREIGN PATENT DOCUMENTS

| | | |
|---|---|---|
| JP | 08020708 A | 1/1996 |
| JP | H0820652 A | 1/1996 |

OTHER PUBLICATIONS

R. Dowbenko, C.C. Andersen, W.-H. Chang, Ind. Engl. Charn. Prod. Res. Develop., vol. 10, No. 3, 1971, 344-351, "Imidazole Complexes as Hardeners for Expoxy Adhesives".

T.D. Bayha, P.P. Osborne, T.P. Thrasher, J.T. Hartness, N.J. Johnston, J.M. Marchello and M.K. Hugh; Processing, Properties and Applications of Composites Using Powder-Coated Expoxy Towpreg Technology; NASA's Fourth Advanced Composites Technology Conference, Salt Lake City, Utah, Jun. 1993.

Database CA [Online] Chemical Abstracts Service, Columbus, Ohio, US; Apr. 18, 1996 Sato, Shoichi et al. "Epoxy resin compositions containing latent hardeners and whiskers, and prepregs with good tack and pliability from them", XP002734544, found in the STN Database accession No. 1996:226040—Summary.

1C SYSTEM, PRODUCTS TO BE MANUFACTURED FROM THE SYSTEM, AND A METHOD FOR MANUFACTURING SEMIFINISHED, FIBER-REINFORCED PRODUCTS AND COMPONENTS WITH THE 1C SYSTEM

CROSS REFERENCE TO RELATED APPLICATIONS

None.

BACKGROUND

The invention relates to a 1C system and a method for manufacturing semifinished products (prepregs) and components with the 1C system.

Prepregs are semifinished products that are to be processed into various spatial components used in various industrial sectors such as aircraft construction.

Customary duroplastic prepregs are comprised of continuous fibers and an unhardened duroplastic plastic matrix and are primarily used in lightweight construction. The continuous fibers form a reinforcement layer and are added to the prepreg in the form of fabrics, scrims or fibers with a unidirectional arrangement. Glass, carbon, basalt or aramid fibers, as examples, are used in connection with this. Because of their excellent plastic workability, the prepregs can be stored and delivered in a sheet or web-type form (on reels). The prepregs have to be cooled while stored, which is a drawback, to prevent a premature reaction of the resin with the curing agent. Storage over long periods of time can only be enabled in that way. A premature hardening of the prepreg already comes about at room temperature, which is a disadvantage; shaping is made more difficult or impossible because of that.

An epoxy resin composition, comprised of a resin and a curing agent and optionally an accelerator, is usually used as the unhardened duroplastic plastic matrix with which the continuous fibers are impregnated. This matrix simultaneously surrounds and imbues (impregnates) the reinforcement layer.

To create the spatial components, customary prepregs are first put into the desired shape and then hardened at a specific temperature. In so doing, cross-linkage of the duroplastic plastic matrix comes about and therefore a hardening and strengthening of the prepreg.

US 2006/035088 A discloses, as an example, a composition for the pre-impregnation of a reinforcement layer in which precisely specified amounts of resins, amine compounds containing sulfur, and urea and dicyanodiamide compounds are mixed together as latent curing agents in a specified order. The carbon fibers, existing in the form of fabric or slivers, are pre-impregnated with this composition. Final products can be created from that under increased pressure and increased temperature in the end.

CN 1027 02683 discloses a composition made of an epoxy resin and colophonium for creating prepregs. A reinforcement layer is soaked with the above-mention composition and processed into a prepreg in presses via a pressure effect or via heating in autoclaves and subsequent cooling. The prepregs that are pre-impregnated in that way can be stored for around one month at room temperature. After the shaping, the prepregs can be hardened by heating them to 125° C.; the colophonium becomes a cross-linking agent. The relatively short storage period of only one month is a drawback here.

JP H0820708 A discloses a method for creating prepregs that are pre-impregnated with a composition made up of epoxy resin and a micro-encapsulated amine adduct as the cross-linking agent. The prepregs are hardened at temperatures over 80° C. by the release of the cross-linking agent.

JP H11171980 A discloses a composition made up of an epoxy resin, a cross-linking agent selected from polyamine, polyphenol or acid anhydride and an organic compound containing phosphorus and boron that is formulated as a solution. Prepregs soaked with that can be easily shaped and are more stable when stored at room temperature.

SUMMARY

The invention relates to a 1C system and a method for manufacturing semifinished products (prepregs) and components with the 1C system. In accordance with the invention, the problem is solved by a 1C system comprised of an epoxy resin and a secondary amine; the secondary amine is imidazole, an imidazole derivative or a complex of the general formula $MeL_4X_2$, wherein Me is a bivalent metal cation selected from copper, cobalt, nickel and zinc, L is a ligand selected from imidazole and an imidazole derivative, and X is an anion selected from fluoride, chloride, bromide, iodide and nitrate. Furthermore, the invention includes a method for manufacturing impregnated semifinished products for the production of duroplastic fiber-reinforced components using a 1C system with the following process steps:
a) Application of the powdered 1C system to a textile reinforcement structure,
b) Melting the 1C system via an increase in temperature up to a temperature below the cross-linking temperature,
c) Cooling of the impregnated semi-finished product.

DETAILED DESCRIPTION

The object of the invention is to specify a 1C system and a method for manufacturing fiber-reinforced components or semifinished products that are created with this 1C system. In the process, the semifinished products should be capable of being stored at room temperature for a long period of time without premature hardening and therefore a significant loss in plasticity.

The problem is solved by a 1C system comprised of an epoxy resin and a secondary amine as per the invention; the secondary amine is an imidazole or an imidazole derivative.

As per the invention, 1C systems (1 component systems) denote compositions that include all of the ingredients relevant for a hardening reaction in only one component. This can also be called a compound. The components involve, as per the invention, a monomer and a latent curing agent. Monomers are understood to be reactive compounds that undergo a chemical reaction with the latent curing agent, also called a hardening reaction, under certain circumstances, for instance an increased temperature. A cross-linked polymer arises in the process.

A complicated mixing of individual components, possibly involving errors, to trigger a hardening reaction is not necessary with 1C systems, which is advantageous.

The epoxy resin is the monomer in the 1C system that includes oligomer compounds with epoxy groups. Oligomers are compounds that are made up of several components that are structurally equivalent or similar. Hardened epoxy resins form cross-linked polymers, so called duroplastic plastics. Duroplastic plastics advantageously have a high level of strength and chemical stability, low sensitivity to moisture and a low level of steam permeability.

As per the invention, a secondary amine designates an amine that has been substituted twice.

The secondary amine imidazole or an imidazole derivative is preferred. As per the invention, an imidazole derivative denotes all compounds that have the same basic structure as the imidazole and whose structure can consequently be derived from the basic imidazole structure.

A 1C system that is solid at room temperature and that can very easily be processed in a powder form is advantageously created. The melting temperature is below the cross-linking temperature here.

The epoxy resin based on bisphenol A is preferred. The epoxy resin is preferably comprised of reaction products from the reaction of bisphenol A with epichlorohydrin. Depending on the molar relationship of the two reaction partners, bisphenol A diglycidyl ether (also called BADGE or DGEBA) or/and oligomer epoxy resins can arise during the reaction of bisphenol A with epichlorohydrin. The oligomer epoxy resins with more than two bisphenol A groups in the molecule are solids at room temperature. The solid is preferably in a particulate form. Particular denotes, as per the invention, particle sizes ≤130 μm.

The commercially available epoxy resin preferably has an epoxy value of 0.05 to 0.56 mol/100 g, and 0.05 to 0.28 mol/100 g is especially preferred. The epoxy value indicates the quantity of epoxy groups in 100 g of epoxy resin.

The epoxy resin preferably has a melting temperature in the range of 50 to 130° C.

The melting temperature describes, as per the invention, the temperature at which the epoxy resin that is a solid at room temperature becomes a liquid.

The 1C system preferably contains 86% to 99% by weight of the epoxy resin, measured with regard to the overall mass of the 10 system, 90% to 98% as a further preference, and 92% to 98% as a special preference.

All of the imidazole derivatives can be used in principle. The imidazole derivative is preferably an imidazole with an alkyl substitute in at least one of the positions 2, 4 or 5 of the imidazole molecule.

The alkyl substituents are preferably selected from methyl, ethyl, propyl, isopropyl, butyl and/or tert-butyl.

The imidazole derivatives are preferably selected from 2-methylimidazole (2-MI), 4-methyl imidazole (4-MI), 2-ethylimidazole (2-EI), 2-ethyl-4-methylimidazole (2-E-4-MI) and 2-isopropylimidazole.

The imidazole derivatives are preferably solid at room temperature.

The imidazole or imidazole derivative is preferably a complex.

The imidazole or imidazole derivative is preferably a complex for which the metal cation (Me) is selected from copper, cobalt, nickel or zinc. The metal cation preferably exists in the form of a bivalent metal cation (Me(II)).

The complex preferably has the general formula $MeL_4X_2$, wherein L stands for a ligand and X stands for an anion. As a preference, the ligand L is imidazole or an imidazole derivative and the anion X is selected from fluoride, chloride, bromide, iodide and/or nitrate.

The 1C system preferably contains 1% to 14% by weight of the imidazole or imidazole derivatives, measured with regard to the overall mass of the 1C system, 2% to 10% by weight as a further preference, and 2% to 8% by weight as a special preference.

The 1C system preferably has a cross-linkage temperature of over 100° C. The cross-linking temperature is the temperature at which the hardening reaction is triggered between the monomer and the latent curing agent.

The fiber-reinforced component or semifinished product as per the invention has the 1C system as per the invention that is described above as the matrix material. All known fibers are possibilities for the reinforcement fibers, especially carbon, glass, aramid, natural, basalt and mixed fibers. The reinforcement fibers here are preferably semifinished textile products such as scrims or fabrics. A fiber-reinforced component as per the invention can be advantageously manufactured in a simple way in comparison to customary duroplastic fiber-reinforced components with the same, very good mechanical and visual characteristics. It is especially advantageous that semifinished products manufactured from the 1C system as per the invention are stable for long periods of time without cooling, because the matrix material is a solid at room temperature. The fact that the semifinished products can be reshaped when heated is a further relevant advantage. The semifinished goods can have an advantageous flat design for transport and, in a subsequent reshaping step, heated to their softening temperature and put into a desired spatial shape. A possibility also exists within the framework of these reshaping steps to add inserts (e.g. metal inserts) to the semifinished products. Several successive instances of reshaping are also possible if necessary.

These instances of reshaping are possible because the melting temperature (the phrase melting temperature refers to the 1C system and the phrase softening temperature refers to the semifinished products manufactured from it) is below the cross-linking temperature; the 1C system, as the matrix material, can liquefy without cross-linking because of that.

The use as per the invention of the 1C system described above as a matrix material for a fiber-reinforced component advantageously makes very simple handing possible in manufacturing in combination with excellent component characteristics. All conceivable manufacturing methods can be used in the process. As an example, the 1C system is also very suitable for manufacturing semifinished impregnated products, because it can be melted down for the impregnation, but only cross-linked at a significantly higher temperature. The 1C system is also suitable for all fiber types, especially the above-mentioned types.

The method as per the invention for manufacturing impregnated semifinished products and components for manufacturing duroplastic fiber-reinforced components uses the above-mentioned 1C system. In principle, a) the powdered 1C system is applied to a textile reinforcement structure in one step; b) the 1C system is melted down by increasing the temperature in one step; and c) the semifinished impregnated product is removed after cooling in one step and, after that, it is d) reshaped in one step or e) the impregnated and cross-linked component is removed in one step.

The powdered 1C system is applied in the process via a spray gun or a shaking sieve. The 1C system can be applied to the full surface of the reinforcement structure here or only in a locally limited way. The addition of the powdered 1C system is simplified by the local application. After the powder melts, it distributes itself extensively over the reinforcement structure. It is likewise possible to put the powdered 1C system into a mold and subsequently insert the reinforcement structure into this mold.

A reinforcement structure here means a structure made up of reinforcing fibers that can have one or several layers or that could even have a complex form.

As was already mentioned, possible fibers are any known fibers for the manufacture of fiber-reinforced components, such as carbon, glass, aramid, natural, basalt and mixed fibers. A combination of different semifinished textile products is also possible.

The method described above can also be carried out in several repetitions, one after the other, to create more complex structures.

The heat for the melting of the 1C system in step b) can be input in a mold and also outside of a mold with a subsequent transfer into it. All of the common methods for adding heat are possible in connection with this, especially electrical or inductive tempering of the mold, as well as tempering via intermediaries (water and oil). The heat can likewise be input outside of the mold by means of infrared rays or other processes to transfer heat. The heat input required for the reshaping of the semifinished products in step d) can take place both to the entire semifinished product and in a limited way to the reshaping zone. An increase in the temperature up to the cross-linking temperature is required for the final cross-linkage of the reshaped, semifinished products. This can both be done in the reshaping mold and subsequent to the reshaping process, for instance in a tempering furnace.

Various processes, for instance one-sided processes like the autoclave process, the diaphragm process or the VARI process can be used to consolidate the components impregnated with the 1K system. The pressing process can be used as a two-sided process. Vacuum support can also be used in the process.

In a preferred embodiment of the method as per the invention for manufacturing semifinished products, the process is carried out continuously. The reinforcement structure is fed in on a conveyor belt or a calender before step a) is carried out for the application of the powdered 1C system. The powdered 1C system is then applied to the reinforcement structure on the conveyor belt or the calender, and heat is likewise applied. As a special preference, contactless possibilities are used here for heating, for instance infrared radiation. The semifinished duroplastic products can be advantageously manufactured with high efficiency in that way in a continuous, automated process.

As a special preference, additional pressure is applied via double-belt presses or calenders for impregnation.

The semifinished products can also be advantageously reshaped once again after the impregnation by heating them to a temperature that is above the melting temperature but below the cross-linking temperature. The semifinished products can be advantageously stored and transported in a flat form in that way and subsequently put into a shape that makes the insertion into a 3D forming mold easier. In an especially preferred embodiment, the reshaping and the final consolidation take pace in one joint process step.

It is understood that the semifinished products can be consolidated by heating them to a temperature above the cross-linking temperature.

Duroplastic fiber-reinforced components can, of course, be manufactured via the 1C system without the intermediate step of the semifinished product by directly consolidating the component after the application of the powdered 1C system.

The manufacturing process of products pre-impregnated and impregnated with the 1C system having a reinforcing fiber layer soaked with the compound is characterized in that the reinforcement layer is coated with the compound made up of reactive epoxy resins, and the layer that is prepared in this way is subsequently accommodated between two layers of a continuous separating agent. After that, the reinforcement layer is soaked with the 1C system with an increased temperature and a specified pressure.

As a preference, the reinforcing fiber layer is soaked with the 1C system with a content of 90 to 98 parts by weight of solid epoxy resin that is mixed with the latent curing agent in the form of modified amines in a quantity of 2 to 10 parts by weight per 100 parts by weight of the 1C system.

As a further preference, the continuous separation layers can be made up of non-impregnable and non-adhesive materials. As an example, foil can be used here.

In one embodiment of the process, the reinforcement layer is coated with a layer of the 1C system with a density of 150 to 170 g/m$^2$.

In a further preferred embodiment of the process, the reinforcement layer that is coated with a layer of the 1C system is soaked at a temperature of 70 to 170° C. for a time period of 5 to 15 minutes.

As a further preference, the reinforcement layer that is coated with a layer of the 1C system and accommodated between two continuous separation layers is soaked at a temperature of 70 to 150° C. for a time period of 5 to 15 minutes under a pressure of 2 to 5 bar.

The pressure for the soaking is preferably applied by a press.

In an alternate variant of the process, the reinforcement layer that is coated with a layer of the 1C system and accommodated between two continuous separation layers is soaked under pressure that is generated in the calenders, which are heated to a temperature of 90 to 120° C.

The essence of the invention with regard to the manufacture of products pre-impregnated with the 1C system, called prepregs or semifinished products, is based on a coating of a reinforcing fiber layer with reactive epoxy resins, a subsequent accommodation of the reinforcement layer coated with EP resin between two continuous separation layers and a soaking of the reinforcement layer with the compound made up of reactive EP resins at an increased temperature and a specific pressure.

An essential characteristic of the process as per the invention is also that the reinforcing fiber layer is soaked with a 1C system with a content of 90 to 98 parts by weight of solid, aromatic epoxy resin that is mixed with a latent curing agent in the form of modified amines in a quantity of 2 to 10 parts by weight per 100 parts by weight of the 1C system.

Another significant characteristic of the process as per the invention is based on the fact that the separation layers, which are preferably used in a continuous way, are made of non-impregnable and non-adhesive material. Examples Another important characteristic of the process as per the invention is the fact that the reinforcement layer is coated with a layer from the 1C system made up of reactive epoxy resins that are uniformly between 150 and 170 g/m$^2$.

A further significant characteristic of the process as per the invention is based on the fact that the reinforcement layer that is coated with the 1C system and accommodated between two continuous separation layers is soaked at temperatures of 70 to 170° C. for a time period of 5 to 15 minutes.

The fact that the reinforcement layer that is coated with the 1C system and accommodated between two continuous separation layers is soaked at temperatures of 70 to 150° C. for a time period of 5 to 15 minutes under a pressure of 2 to 5 bar is also among the important characteristics of the process as per the invention.

In accordance with one of the variants of the process as per the invention, the reinforcement layer that is coated with the 1C system and accommodated between two continuous separation layers is soaked under pressure in a press.

In accordance with another variant of the process as per the invention, the reinforcement layer that is coated with the 1C system and accommodated between two continuous separation layers is soaked under pressure (compression) that is generated with calenders heated to 90 to 120° C.

The use of the technical solution as per the invention brings along numerous and, at the same time, new and amazingly high-value technical characteristics; the most important one is based on the fact that the 1C system as per the invention, and within it the resin types and latent curing agents that are used, causes the cross-linking process in the 1C system to only start up at higher temperatures, i.e. at over 100° C. The above-mentioned characteristic of the 1C system as per the invention likewise enables both the 1C system and also the prepregs that are manufactured using the 1C system to be stored, not necessarily at low temperatures, but at room temperatures and over a much longer period of time, even beyond 12 months. The prepregs that are manufactured retain the required plasticity and workability for manufacturing products in any arbitrary shape during the storage period, because the progress of the cross-linking does not exceed 5% even after 12 months of storage at room temperature.

The 1C system as per the invention that is used when manufacturing prepregs permits the creation of products with high durability characteristics with substantially lower material costs. The costs are reduced to approximately 40%.

The method for manufacturing prepregs according to technical solutions as per the invention also excludes the use of solvents and dispersing agents, which is likewise reflected in the above-mentioned reduction of costs.

A method for joining semifinished products as per the invention is a further part of the invention. In this process, the areas to be joined are brought into contact in a first step a). The contact should be over a plane in the process, at least in part.

After that, pressure and heat are applied to the joining area in a step b). Subsequent to that, the joining area is cooled down in a step c).

The joining area is firmly bonded in that way. The bond can be undone via renewed heating when there is heating above the melting temperature but below the cross-linking temperature. This can be advantageous for joining several components in overlapping joining areas, because a further semifinished product can be joined by renewed heating in the joining area. Complex structures can be created with a simple procedure in that way.

As a preference, the reinforcement structures of the semifinished products are also mechanically joined. This can be done, as an example, in a positive-locking or force-locking way, for instance via reshaping, sewing or a bolt connection.

The possibility also exists, of course, to increase the temperature above the cross-linking temperature in step b) causing the joining area to be consolidated.

BRIEF DESCRIPTION OF THE DRAWINGS

The invention is to be explained in more detail, without limiting it, with the aid of the descriptions and examples that are provided. The figures show the following here.

Figure 1:
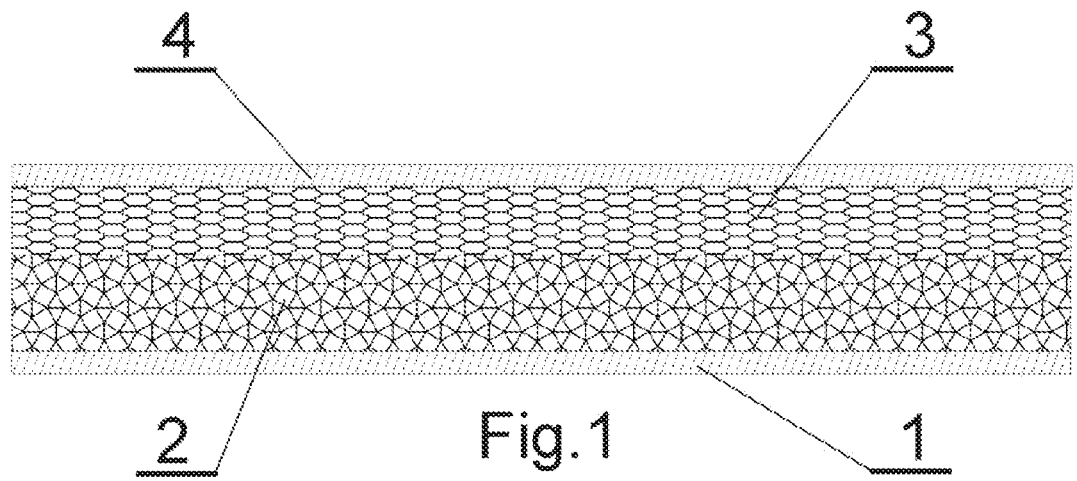
FIG. 1 shows the layer-type structure of a prepreg as per the invention.

DETAILED DESCRIPTION OF THE PREFERRED EMBODIMENT a) Production of a 1C Epoxy Resin Example 1

To manufacture a 1C system as per the invention, 98% by weight of BPA epoxy resin with an epoxy value of 0.26 mol/100 g and a softening temperature of 55° C. is mixed in a double-cone mixer for 20 min. with 2% by weight of 2-methylimidazole at room temperature.

A quantity of the 10 system as per the invention was prepared by mixing 98 parts by weight of BPA epoxy resin (E2) having an epoxy value of 0.26 mol/100 g and a softening temperature of 55° C. with 2 parts by weight of 2-methylimidazole (2MI) at room temperature for 20 minutes in a double-cone mixer. The mixture that was prepared was ascertained in a DSC analysis by determining the enthalpy of the cross-linking process, which is approx. 180 J/g, and the maximum cross-linking temperature, which is approx. 85° C.

Example 2

A quantity of the 1C system as per the invention was prepared by mixing 92 parts by weight of BPA epoxy resin (E1) having an epoxy value of 0.20 mol/100 g and a softening temperature of 63° C. with 8 parts by weight of a latent curing agent based on 2-methylimidazole with a general formula of $(Cu(2MI)_4Cl_2)$ at a temperature of 80° C. for 10 minutes with an anchor agitator. The 1C system that was produced was formed into a band shape, cooled down to 25° C. and ground down in blade granulator.

The mixture that was prepared was ascertained in a DSC analysis by determining the enthalpy of the cross-linking process, which is approx. 260 J/g, and the maximum cross-linking temperature, which is approx. 150° C.

b) Production of a Prepreg

Example 1

In accordance with a first example of the implementation of the method for manufacturing products pre-impregnated with the 1C system, called prepregs, the reinforcement layer 2, comprising a fabric made of carbon fibers with a weight of 410 g/m$^2$, is prepared in terms of its dimensions in the first step of the process. The upper surface of the reinforcement layer 2 is coated with a pulverized 1C system; the pulverized 1C system is applied as layer 3 with a uniform density of 170 g/m$^2$ in the process.

Layers of the reinforcement and of the 1C system that are prepared in this way are accommodated in a press most economically in the form of a sheet of silicone paper 1 on a continuous separation layer made up of non-impregnable and non-adhesive material; after that, the upper layer is laid on it in the form of a second sheet of silicone paper 4.

The compulsory arrangement of the individual prepreg layers is shown pictorially in FIG. 1, in which a cross-section of the prepreg can be seen; the plane is perpendicular to all of the layers.

A stack that is prepared in this way is accommodated in a press with heating plates and heated to 80° C. It is kept at this temperature for 10 minutes and a pressure of 2 bar is simultaneously exerted on the stack in the process.

The prepreg cools down on its own after the completion of the heat and pressure phase. The arrangement of the individual layers after the cooling is shown in a cross-section in FIG. 2.

Figure 2:
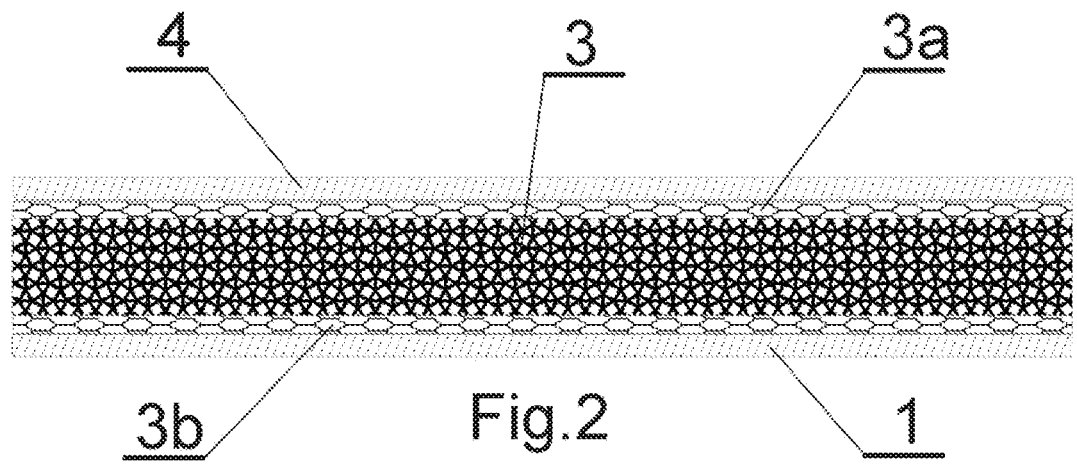
FIG. 2 shows the prepreg according to FIG. 1 after the impregnation.

As shown in FIG. 2 and as can be concluded from the drawing, the 1C system layer 3 from FIG. 1 is converted from a solid state into a semi-liquid state while being kept hot and while being subjected to pressure on the prepreg, and it penetrates and soaks the reinforcement layer 2. In the process, the outer protective layers 3a and 3b, which can be seen in FIG. 2, form on both sides from the 1C system.

The material for prepregs that is created in this way has the characteristics shown in Table 1.

TABLE 1

| Storage time [Month] | Cross-linking enthalpy [J/g] | Change in reactivity capability (Enthalpy difference) [%] | Max. cross-linking temperature [° C.] |
|---|---|---|---|
| 0 | 120.6 | — | 88 |
| 1 | 118.3 | 1.9 | 90 |
| 2 | 117.8 | 2.3 | 91 |
| 3 | 117.2 | 2.8 | 91 |
| 6 | 114.9 | 4.7 | 93 |

Example 2

In accordance with a second example of the implementation of the method for manufacturing prepregs, a reinforcement layer is prepared in the first step of this example that is a fabric band made of basalt fibers with a weight of 210 g/m². The upper surface of the reinforcement layer is coated with a pulverized 1C system; the pulverized 1C system is applied as layer with a uniform density of 140 g/m2 in the process.

Layers of the reinforcement and of the 1C system that are prepared in that way are accommodated between two band-shaped layers made of silicone paper; after that, the stack is put into a calender that has been heated up to 90° C. The conveyor speed of the bands is 0.5 m/minute in the calenders.

The band-shaped prepreg that is produced cools down on its own and is then wound onto rollers.

The characteristics of the prepreg that was manufactured in accordance with the second example of the method as per the invention and that were investigated within 12 months of storage time are shown in Table 2.

TABLE 2

| Storage time [Month] | Cross-linking enthalpy [J/g] | Change in reactivity capability (Enthalpy difference) [%] | Max. cross-linking temperature [° C.] |
|---|---|---|---|
| 0 | 200.2 | — | 162 |
| 1 | 199.3 | 0.5 | 162 |
| 2 | 198.7 | 0.7 | 163 |
| 3 | 198.1 | 1.0 | 163 |
| 6 | 197.3 | 1.4 | 164 |
| 12 | 192.8 | 4.0 | 167 |

Example 3

The following example describes the production of a tub made of a prepreg. The prepreg is comprised of a glass cloth with a plain weave. The layer thickness is approx. 0.35 mm. Six layers are positioned one over the other in a mold and pre-heated in an infrared heater at a temperature of approx. 110° C. with a holding time of 30 s. After that, the layer stack is put into a mold tempered to 120° C., reshaped by closing the mold and consolidated at a pressure of 40 bar over a time period of 10 min.

After cooling, the tub that is now consolidated is removed from the mold and the edges are reworked if necessary.

Example 4

The following example describes the production of the tub from Example 3 using carbon-fiber fabric and the 1C system as per the invention.

The starting point is a carbon-fiber fabric in a twill weave (2/2) with a layer thickness of 0.56 mm and a weight per unit area of 400 g/m². The individual cut sections for the fiber layers have a size of 320×210 mm.

First, a quantity of approx. 15 g of the powdered 1C system are applied to a layer of the fabric and distributed with a spatula. A further layer is then put on this layer and 15 g of the 1C system are once again distributed on it. This is repeated until four layers are positioned one over the other; 15 g of the 1C system are applied between each of the layers.

25 g of the 1C system are likewise distributed with a spatula on top of the last (fourth) layer. Before the stack is put into the mold, 25 g of the 1C system are likewise distributed over the surface in the mold and the stack is then placed on top of it. After that, the mold, tempered to 120° C., is closed. The hardening takes place at a pressure of 40 bar over a time period of 10 min. After cooling, the workpiece is removed and reworked if necessary.

LIST OF REFERENCE NUMERALS

1 Silicone paper
2 Reinforcement layer/reinforcement structure
3 1C system
3a Outer protective layer of the 1C system
3b Outer protective layer of the 1C system
4 Silicone paper

The invention claimed is:

1. 1C system comprised of an epoxy resin and a secondary amine as a curing agent, characterized in that the secondary amine is a complex of the general formula $MeL4X2$, wherein Me is a bivalent metal cation selected from copper, cobalt, nickel and zinc, L is a ligand selected from imidazole and an imidazole derivative, and X is an anion selected from fluoride, chloride, bromide, iodide and nitrate.

2. 1C system according to claim 1, characterized in that the epoxy resin is based on bisphenol A.

3. 1C system according to claim 1, characterized in that the epoxy resin has an epoxy value of 0.05 to 0.28 mol/100 g.

4. 1C system according to claim 1, characterized in that the epoxy resin has a softening temperature in the range of 50 to 130° C.

5. 1C system according to claim 1, characterized in that the 1C system includes 86 to 99% by weight of the epoxy resin, measured with regard to the total mass of the 1C system.

6. 1C system according to claim 1, characterized in that the imidazole derivative is an imidazole with an alkyl substituent in at least one of the positions 2, 4 or 5 of the imidazole molecule.

7. 1C system according to claim 1, characterized in that the imidazole or the imidazole derivative is a complex.

8. 1C system according to claim 1, characterized in that the 1C system includes 1 to 14% by weight of the imidazole or imidazole derivative, measured with regard to the total mass of the 1C system.

9. 1C system according to claim 1, characterized in that the 1C system has a cross-linking temperature of over 100° C.

10. 1C system according to claim 1, characterized in that the IC system is a matrix material for a fiber-reinforced component.

11. Method for manufacturing impregnated semifinished products for the production of duroplastic fiber-reinforced components using a 1C system according to claim 1 characterized by the following process steps:

a) Application of the powdered 1C system according to claim 1 to a textile reinforcement structure;

b) Melting the 1C system via an increase in temperature up to a temperature below the cross-linking temperature;

c) Cooling of the impregnated semifinished product.

12. Method according to claim 11, characterized in that the powdered 1C system in step a) is applied via spraying or screening.

13. Method according to claim 11, characterized in that the 1C system is applied over the entire area or on a local basis and either directly onto the reinforcement structure or onto the mold before the insertion of the reinforcement structure.

14. Method according to claim 11, characterized in that the reinforcement structure is made up of several layers and the 1C system is also applied between the layers.

* * * * *